United States Patent
Hatta

(10) Patent No.: US 11,493,172 B2
(45) Date of Patent: Nov. 8, 2022

(54) MANUFACTURING METHOD OF TANK

(71) Applicant: TOYOTA JIDOSHA KABUSHIKI KAISHA, Toyota (JP)

(72) Inventor: Ken Hatta, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/198,582

(22) Filed: Mar. 11, 2021

(65) Prior Publication Data

US 2021/0332947 A1 Oct. 28, 2021

(30) Foreign Application Priority Data

Apr. 27, 2020 (JP) .............................. JP2020-078090

(51) Int. Cl.
| | | |
|---|---|---|
| *B29C 70/02* | (2006.01) | |
| *F17C 1/06* | (2006.01) | |
| *B29L 31/00* | (2006.01) | |
| *B29K 307/04* | (2006.01) | |
| *B29K 509/08* | (2006.01) | |
| *B29C 70/66* | (2006.01) | |

(52) U.S. Cl.
CPC .............. *F17C 1/06* (2013.01); *B29C 70/025* (2013.01); *B29C 70/66* (2013.01); *B29K 2307/04* (2013.01); *B29K 2509/08* (2013.01); *B29K 2995/0092* (2013.01); *B29L 2031/7156* (2013.01); *F17C 2203/0604* (2013.01); *F17C 2203/0673* (2013.01)

(58) Field of Classification Search
CPC ........ B29C 70/025; B29C 70/66; B29C 70/48
See application file for complete search history.

(56) References Cited

U.S. PATENT DOCUMENTS

| | | | | |
|---|---|---|---|---|
| 2,977,269 A | * | 3/1961 | Nerwick ................ | B29D 22/00 264/315 |
| 3,028,284 A | * | 4/1962 | Reeves .................. | B29C 70/48 156/215 |
| 3,177,105 A | * | 4/1965 | Wiltshire .............. | B29C 70/342 156/218 |

(Continued)

FOREIGN PATENT DOCUMENTS

| | | | | |
|---|---|---|---|---|
| JP | 2016-026239 A | | 2/2016 | |
| JP | 2019-056415 A | | 4/2019 | |
| WO | WO-2018211258 A1 | * | 11/2018 | ........... B29C 70/342 |

OTHER PUBLICATIONS

Qiao, Y., X. Wang, X. Zhang, Z. Xing, Thermal conductivity and compressive properties of hollow glass microsphere filled epoxy-matrix composites, Journal of Reinforced Plastics and Composites, vol. 34, No. 17 (2015), pp. 1413-1421. (Year: 2015).*

(Continued)

*Primary Examiner* — Matthew J Daniels
(74) *Attorney, Agent, or Firm* — Finnegan, Henderson, Farabow, Garrett & Dunner, LLP

(57) ABSTRACT

Provided is a manufacturing method for manufacturing a high-pressure tank by infiltrating resin into a fiber layer of a preform in which the fiber layer is formed on an outer surface a liner. The manufacturing method includes: a first supply step of supplying resin to the fiber layer of the preform; and a second supply step of, after the first supply step, supplying, to the fiber layer, resin to which spherical particles are added.

2 Claims, 10 Drawing Sheets

(56) References Cited

U.S. PATENT DOCUMENTS

| | | | | |
|---|---|---|---|---|
| 3,937,781 | A * | 2/1976 | Allen | B29C 70/443 |
| | | | | 264/269 |
| 4,785,956 | A * | 11/1988 | Kepler | F17C 1/16 |
| | | | | 220/62.19 |
| 5,034,173 | A * | 7/1991 | Altman | B29C 70/48 |
| | | | | 264/102 |
| 6,660,214 | B2 * | 12/2003 | LeBreton | B29C 33/505 |
| | | | | 264/516 |
| 2008/0264551 | A1 * | 10/2008 | Wood | B29C 45/14786 |
| | | | | 156/172 |
| 2013/0035013 | A1 | 2/2013 | Wong et al. | |
| 2015/0034233 | A1 * | 2/2015 | Hatta | B29D 22/00 |
| | | | | 156/172 |
| 2017/0191618 | A1 * | 7/2017 | Kloft | F17C 1/00 |
| 2019/0084249 | A1 | 3/2019 | Hatta | |
| 2020/0094496 | A1 * | 3/2020 | Santoni | B29C 70/46 |
| 2022/0134606 | A1 * | 5/2022 | Harada | B29C 70/48 |
| | | | | 264/257 |

OTHER PUBLICATIONS

Huang, C., Z. Huang, X. Lv, G. Zhang, Q. Wang, B. Wang, Surface modification of hollow glass microsphere with different coupling agents for potential applications in phenolic syntactic foams, Journal of Applied Polymer Science (2017), 14 pages. (Year: 2017).*

* cited by examiner

MANUFACTURING METHOD OF TANK

CROSS-REFERENCE TO RELATED APPLICATION

This application claims priority to Japanese Patent Application No. 2020-078090 filed on Apr. 27, 2020, incorporated herein by reference in its entirety.

BACKGROUND

1. Technical Field

This disclosure relates to a high-pressure tank including a reinforced layer reinforced by a fiber layer impregnated with resin, and a protective layer laminated on the reinforced layer. This disclosure also relates to a manufacturing method for manufacturing the high-pressure tank.

2. Description of Related Art

A high-pressure tank for a fuel cell vehicle includes a liner forming an internal space of the high-pressure tank, and a reinforced layer having a fiber layer impregnated with resin is placed on the outer periphery of the liner, for example. Hereby, the high-pressure tank achieves high strength. Further, in order to prevent scratches on the fiber layer included in the reinforced layer and to determine whether fiber is damaged or not, a protective layer formed by laminating glass fiber is provided around the reinforced layer.

Japanese Unexamined Patent Application Publication No. 2019-056415 (JP 2019-056415 A) describes a manufacturing method of a high-pressure tank. In the manufacturing method, a preform configured such that a fiber layer is provided on an outer surface of a liner forming an internal space of a high-pressure tank is placed inside a metal mold, and the fiber layer is impregnated with resin in such a manner that, while resin is emitted toward the preform placed inside the metal mold, the preform is rotated in the circumferential direction inside the metal mold around the central axis of the preform as a rotation center.

Japanese Unexamined Patent Application Publication No. 2016-026239 (JP 2016-026239 A) describes that, at the time of impregnation of resin, expandable microspheres are placed on the preform, and when the expandable microspheres are exposed to a hot condition, the expandable microspheres explode to release a foaming agent contained inside the microspheres.

SUMMARY

In the related art, a high-pressure tank is manufactured in the following procedure. That is, after carbon fiber impregnated with epoxy resin is wound around a liner, glass fiber impregnated with epoxy resin is wound, and after that, the epoxy resin is hardened. This method requires many steps and causes an increase in cost, and further, continuous production of the high-pressure tank is difficult. Thus, this method has a problem with productivity.

Further, it is conceivable that a liner is impregnated with resin after carbon fiber and glass fiber are laminated on the liner. However, a high-pressure tank requires high strength, and therefore, it is necessary to form a thick fiber layer (a layer made of carbon fiber). If glass fiber is laminated in addition to such a thick fiber layer, the impregnation with resin is highly difficult. This easily causes problems such as poor impregnation and poor molding.

This disclosure has been accomplished in consideration of the above-mentioned circumstances, and a main object of this disclosure is to provide a manufacturing method of a high-pressure tank with an excellent productivity even when the high-pressure tank includes a reinforced layer and a protective layer. Further, this disclosure provides a high-pressure tank for that purpose.

This disclosure discloses a manufacturing method for manufacturing a high-pressure tank by infiltrating resin into a fiber layer of a preform in which the fiber layer is formed on an outer surface a liner. The manufacturing method includes: a first supply step of supplying resin to the fiber layer of the preform; and a second supply step of, after the first supply step, supplying, to the fiber layer, resin to which spherical particles are added.

The resin supplied in the second supply step may be resin configured to harden when a base compound is mixed with a hardening agent.

The spherical particles may include at least either of resin hollow particles having surfaces to which a minute material is attached and resin hollow particles having surfaces to which a conductive material is attached.

The spherical particles may include at least either of glass hollow particles having surfaces to which a surface active agent including hydrophilic groups arranged to face outward is attached and glass hollow particles having surfaces to which a surface active agent including hydrophobic groups arranged to face outward is attached.

This disclosure discloses a high-pressure tank including a liner, a reinforced layer, and a protective layer. The reinforced layer is placed on an outer periphery of the liner and formed such that carbon fiber is impregnated with resin. The protective layer is formed such that particles are placed on an outer periphery of the reinforced layer.

With this disclosure, a manufacturing method of a high-pressure tank with an excellent productivity even when the high-pressure tank includes a reinforced layer and a protective layer can be provided. Further, this disclosure can provide a high-pressure tank manufactured by the manufacturing method.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. Embodiment 1

1.1. Structure of High-Pressure Tank

Figure 1:
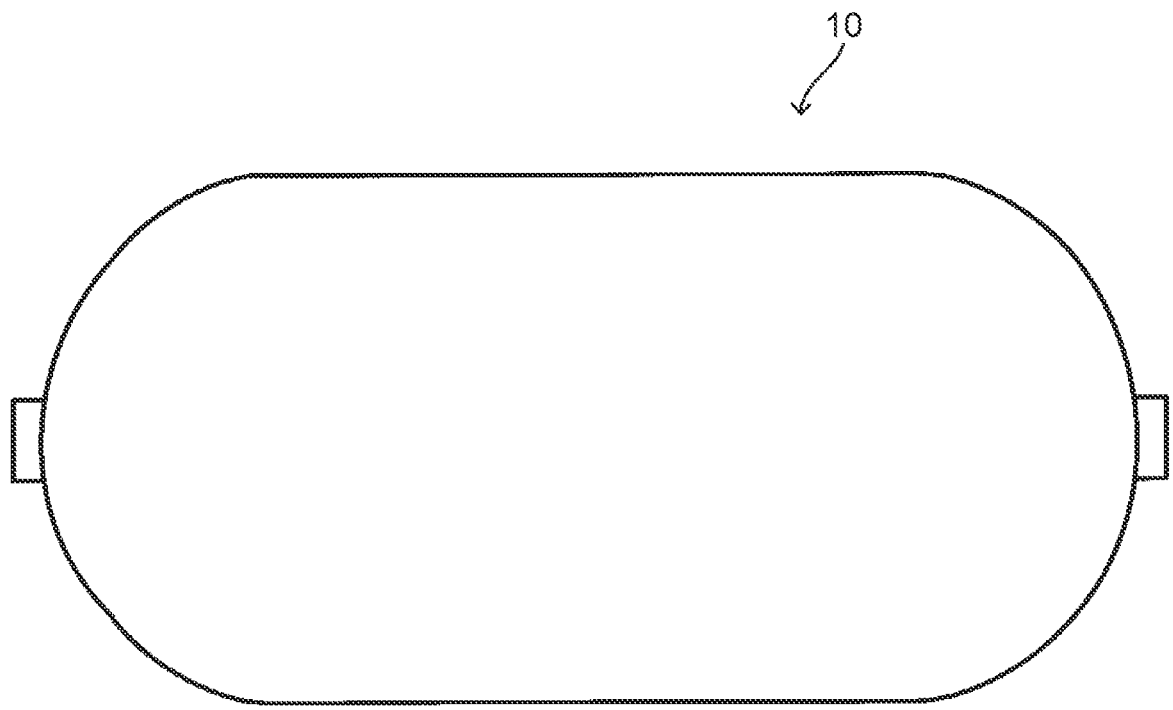
FIG. 1 illustrates an appearance of a high-pressure tank 10.
Figure 2A:
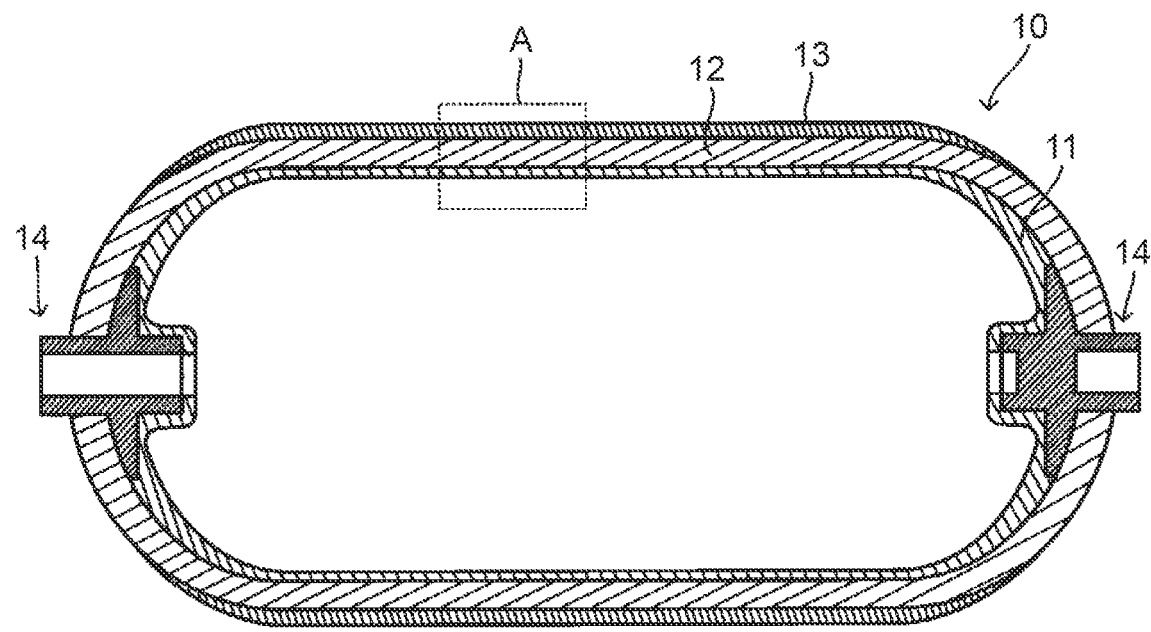
FIG. 2A is a view illustrating a section of the high-pressure tank 10.
Figure 2B:
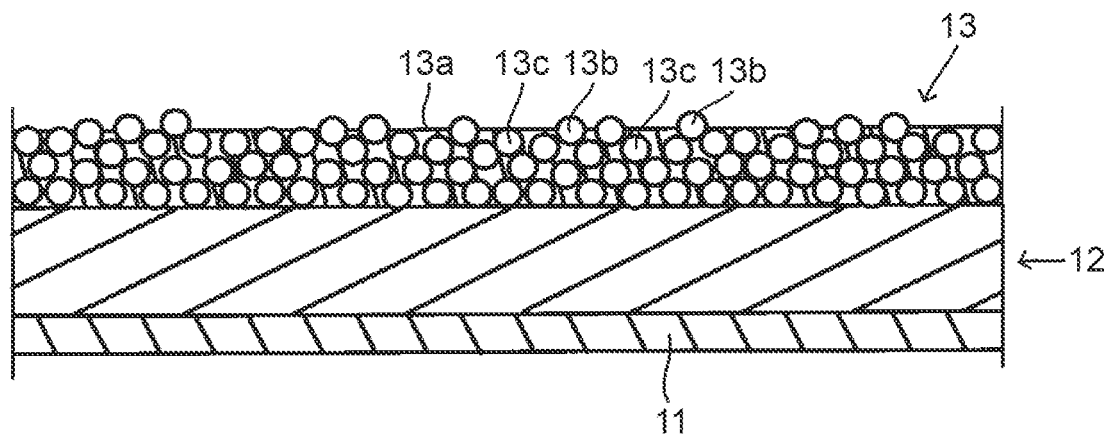
FIG. 2B is a view illustrating part of FIG. 2A in an enlarged manner.

FIG. 1 schematically illustrates an appearance of a high-pressure tank 10 according to Embodiment 1, and FIG. 2A schematically illustrates a section of the high-pressure tank 10 along its axis. Further, FIG. 2B is an enlarged view of a part indicate by A in FIG. 2A and illustrates a view to describe a layer configuration included in the high-pressure tank 10.

As can be seen from these figures, the high-pressure tank 10 includes a liner 11, a reinforced layer 12, a protective layer 13, and mouth pieces 14. The following describes each constituent.

Liner

The liner 11 is a hollow member configured to section an internal space of the high-pressure tank 10. The liner should be constituted by a material that can hold a content (e.g., hydrogen) stored in the internal space without leaking the content, and well-known materials can be used. The liner is, for example, made of nylon resin, polyethylene-based synthetic resin, metal such as stainless steel or aluminum, or the like.

The thickness of the liner 11 is not limited in particular but can be from about 0.5 mm to about 1.0 mm.

Reinforced Layer

The reinforced layer 12 includes a fiber layer and resin infiltrated into the fiber layer and hardened. The fiber layer is configured such that a fiber bundle is wound around an outer surface of the liner 11 to form multiple layers in a predetermined thickness. The thickness of the reinforced layer 12 is determined based on necessary strength and is not limited in particular. However, the thickness of the reinforced layer 12 is from about 10 mm to about 30 mm. It is necessary for the high-pressure tank for a fuel cell vehicle, in particular, to have a thick reinforced layer for securing of strength. From the viewpoint of impregnation of the fiber layer with resin, the fiber layer being formed to be thick along with the thickening of the reinforced layer, the impregnation with resin is highly difficult. Note that the liner 11 side of the fiber layer from an intermediate position of the fiber layer in its thickness direction may be referred to as "inner layer side," and an opposite side (an outer peripheral side) to the liner 11 side in the fiber layer from the intermediate position of the fiber layer in its thickness direction may be referred to as "outer layer side."

Carbon fiber is used for the fiber bundle in the fiber layer. The fiber bundle has a belt shape in which the carbon fiber forms a bundle with a predetermined sectional shape (e.g., a rectangular section). The fiber bundle is not specifically limited in particular, but the sectional shape of the fiber bundle may be a rectangular shape with a width of about 6 mm to about 9 mm and a thickness of about 0.1 mm to about 0.15 mm. The amount of carbon fiber included in the fiber bundle is also not limited in particular, but the fiber bundle may be made of about 36000 carbon fibers, for example.

The fiber layer is formed such that such a fiber bundle made of carbon fiber is wound around the outer surface of the liner 11. The winding of the fiber bundle around the liner 11 can be performed by a filament winding method, for example.

The resin infiltrated into the fiber layer and hardened in the reinforced layer 12 is not limited in particular, provided that the strength of the fiber layer can be increased such that the resin is infiltrated into the fiber layer in a fluid state at first and then hardened by a given method. For example, the resin can be thermoset resin to be hardened by heat such as epoxy resin and unsaturated polyester resin containing an amine-based or anhydride-based hardening accelerator and a rubber-based impact modifier. Another example is a resin composition containing epoxy resin as a base compound and hardened when a hardening agent is mixed with this. In this case, after the base compound is mixed with the hardening agent, but before the resin composition as a resultant mixture is hardened, the resin composition is caused to reach the fiber layer and infiltrated into the fiber layer. Hereby, the resin composition is hardened automatically.

Protective Layer

The protective layer 13 is laminated on the outer periphery of the reinforced layer 12. As can be seen from FIG. 2B, the protective layer 13 of the present embodiment includes a binder layer 13a and a plurality of particles 13b and particles 13c held by the binder layer 13a.

The binder layer 13a is a part that holds the particles 13b and the particles 13c such that the reinforced layer 12 is connected to the particles 13b and the particles 13c. As can be understood from a manufacturing method to be described later, the binder layer 13a is made of the same resin as the resin infiltered into the fiber layer of the reinforced layer 12 and hardened. Hereby, the protective layer 13 can be formed efficiently, and integration of the protective layer 13 with the reinforced layer 12 can be achieved.

The particles 13b and the particles 13c constitute the protective layer 13 such that innumerable particles 13b and particles 13c are placed to cover the reinforced layer 12. The particles 13b and the particles 13c in the present embodiment are hollow particles made of resin.

In the present embodiment, the particles 13b and the particles 13c are particles made of resin. Since the particles 13b and the particles 13c are made of resin, they have flexibility. This increases impact absorbency, thereby making it possible to increase a function as the protective layer. The particles 13b and the particles 13c are not limited in particular, provided that they are made or resin. Examples of the resin include: polyolefin resin such as polyethylene, polypropylene, olefin-based thermoplastic elastomer, and ionomer; acryl resin such as polymethylmethacrylate and polybutyl methacrylate; thermoplastic polyester resin such as polyethylene terephthalate, polybutylene terephthalate, and polyethylene naphthalate; thermoplastic urethane resin; vinyl-chloride-based resin such as polyvinyl chloride; thermo plastic resin such as acrylonitrile-butadiene-styrene copolymer (ABS resin) and styrene resin; thermosetting resin such as melamine resin and unsaturated polyester resin; and ionizing radiation curable resin that hardens by ionizing radiation (ultra-violet rays, electron beam, and the like) such as acrylate-based resin of a radical polymerization type and epoxy-based resin of a cationic polymerization type.

Further, the particles 13b and the particles 13c can be solid or hollow, but it is preferable that the particles 13b and the particles 13c be hollow. This can increase an impact absorption function and achieve weight reduction.

The shapes of the particles 13b and the particles 13c are not limited in particular, but it is preferable the particles 13b and the particles 13c have a spherical shape or a shape close to the spherical shape. This can restrain particle surfaces from damaging the reinforced layer.

The particle diameters of the particles 13b and the particles 13c are not limited in particular, but the particles 13b and the particles 13c have at least a size that does not allow them to greatly enter gaps in the fiber layer of the reinforced layer 12. Generally, fibers are wound in the fiber layer without any gap, and therefore, the particles 13b and the particles 13c do not greatly enter the fiber layer. However, the average particle diameters of the particles 13b and the particles 13c can be not less than 20 µm but not more than 100 µm, for example. Here, the average particle diameter of particles is a value of the median diameter (D50) on the volumetric basis, measured by particle size distribution measurement by a laser diffraction and scattering method. The median diameter (D50) is a diameter (a volume average diameter) that achieves half (50%) of a whole accumulated volume of the particles when the particles are arranged in ascending order in diameter.

In the present embodiment, the particles 13b are formed to have rough surfaces. A method for roughening the surfaces of the particles 13b is not limited in particular, but a material such as minute calcium carbonate can be attached onto the surfaces of the particles like the present embodiment. Accordingly, the surfaces of the particles themselves may be roughened, or a minute material other than calcium carbonate may be attached onto the surfaces of the particles, provided that the particles 13b are particles subjected to a method for roughening their surfaces.

When the particles 13b have rough surfaces as such, it is possible to increase adhesion properties of the particles 13b with the binder layer 13a and the reinforced layer 12.

In the present embodiment, the particles 13c are configured such that conductivity is given to their surfaces. A method for giving conductivity to the surfaces of the particles 13c is not limited in particular, but a conductive material such as silver can be attached onto the surfaces of the particles like the present embodiment. Accordingly, the material to be attached to the surfaces of the particles may be a material other than silver, e.g., gold or copper, provided that the particles have surfaces to which a material having conductivity is attached.

Hereby, it is possible to increase the adhesion properties of the particles 13c with the binder layer 13a, the reinforced layer 12, and a label (not shown).

Here, the label is a metal thin plate (with a plate thickness of about 0.1 mm) the planar shape of which is generally rectangular and has manufacture information such as a manufacturing number of a high-pressure tank and a manufacturing history (a production date, a factory, a manufacturing line, and so on). Generally, the label is embedded in the protective layer and is placed such that a surface on which the manufacture information is described faces outside the high-pressure tank.

The thickness of the protective layer 13 is not limited in particular but can be from about 0.2 mm to about 3.0 mm.

Further, the mix proportion between the particles 13b and the particles 13c is not limited in particular, but if the high-pressure tank does not need so high conductivity, it is preferable that the amount of the particles 13b be larger than the amount of the particles 13c from the viewpoint of performance.

The present embodiment deals with an example in which two types of particles, i.e., the particles 13b and the particles 13c, are included. However, it is not necessary to use two types of particles, and particles of either one of the types may be used.

Further, in the present embodiment, particles with rough surfaces are employed as the particles 13b, and particles having conductivity are employed as the particles 13c. However, the present disclosure is not limited to this, and normal particles with surfaces to which such functions are not given can be employed. Even in this case, the function as the protective layer is achievable.

Mouth Piece

The mouth pieces 14 are members attached to two open ends of the liner 11, respectively, and one of the mouth pieces 14 functions as an opening via which the inside of the high-pressure tank 10 communicates with the outside of the high-pressure tank 10 and also functions as an attachment portion via which a pipe or a valve is attached to the high-pressure tank 10. Further, the mouth piece 14 also functions as an attachment portion via which the liner 11 is attached to a filament winding apparatus when the reinforced layer 12 is formed.

1.2. Structure of Preform

The preform 20 is an intermediate member that finally becomes the high-pressure tank 10 and includes at least the liner 11 and the fiber layer 22. Accordingly, the preform 20 is a member before the fiber layer of the reinforced layer 12 is impregnated with resin. Accordingly, the liner 11 and the fiber layer 22 included in the preform 20 are similar to the liner 11 and the fiber layer described in terms of the high-pressure tank 10, and therefore, and respective configurations of the liner 11 and the fiber layer 22 are not described.

When the fiber layer 22 of the preform 20 is impregnated with resin, and the particles 13b and the particles 13c are laminated to form the protective layer 13, the high-pressure tank 10 is manufactured.

1.3. Manufacturing Apparatus for High-pressure Tank

Figure 3A:
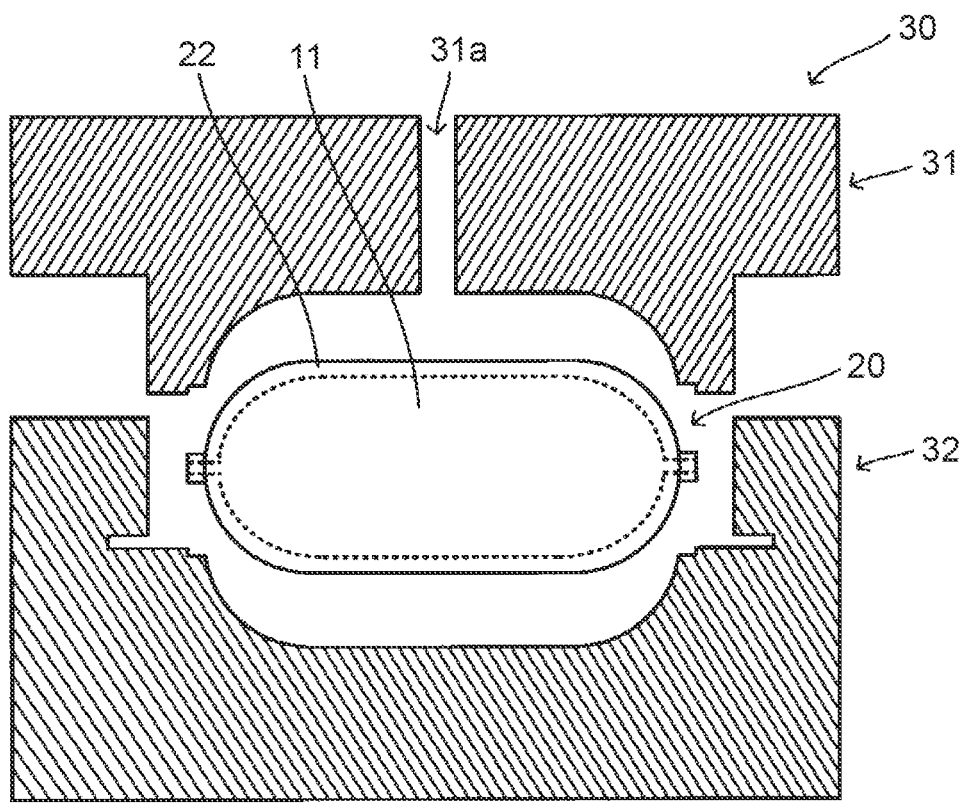
FIG. 3A is an exploded view to describe a mold 30.
Figure 3B:
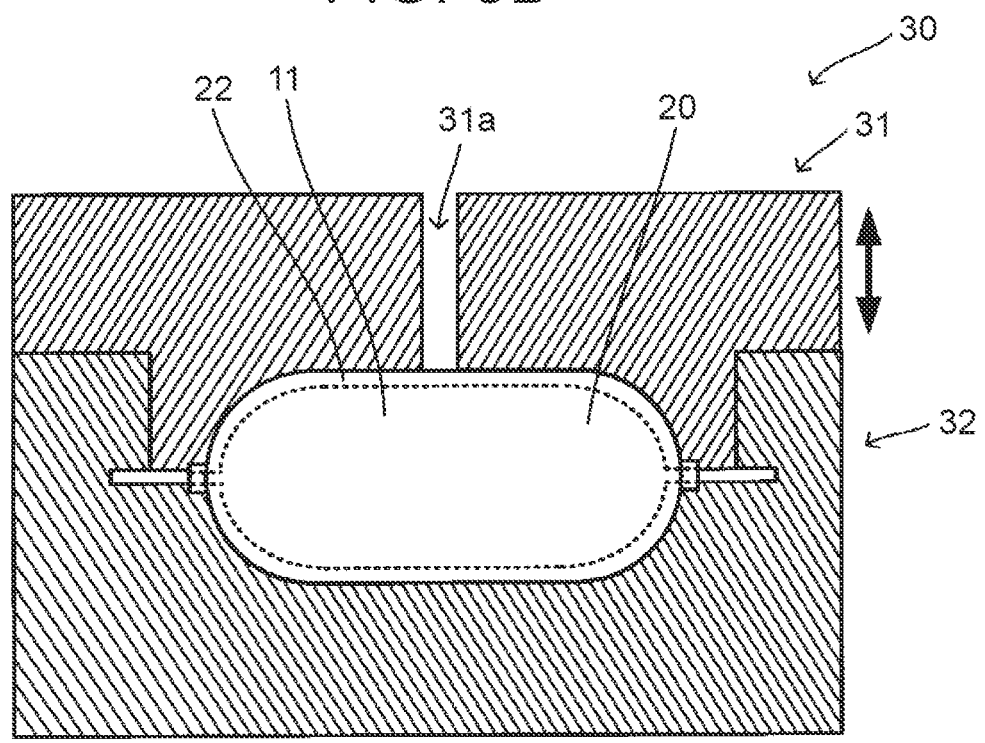
FIG. 3B is a view in which the mold 30 is combined with a preform 20.

FIGS. 3A, 3B schematically illustrate the preform 20 and a mold 30 in which the preform 20 is to be impregnated with resin. Further, in FIGS. 3A, 3B, a section of the mold 30 is illustrated. A surface of the preform 20 is illustrated instead of its section, and an inner form of the preform 20 is illustrated by a broken line. This also applies to the following drawings.

FIG. 3A is a view illustrating the mold 30 and the preform 20 in an exploded manner. FIG. 3B is a view illustrating a state where the preform 20 is set in the mold 30.

Figure 4:
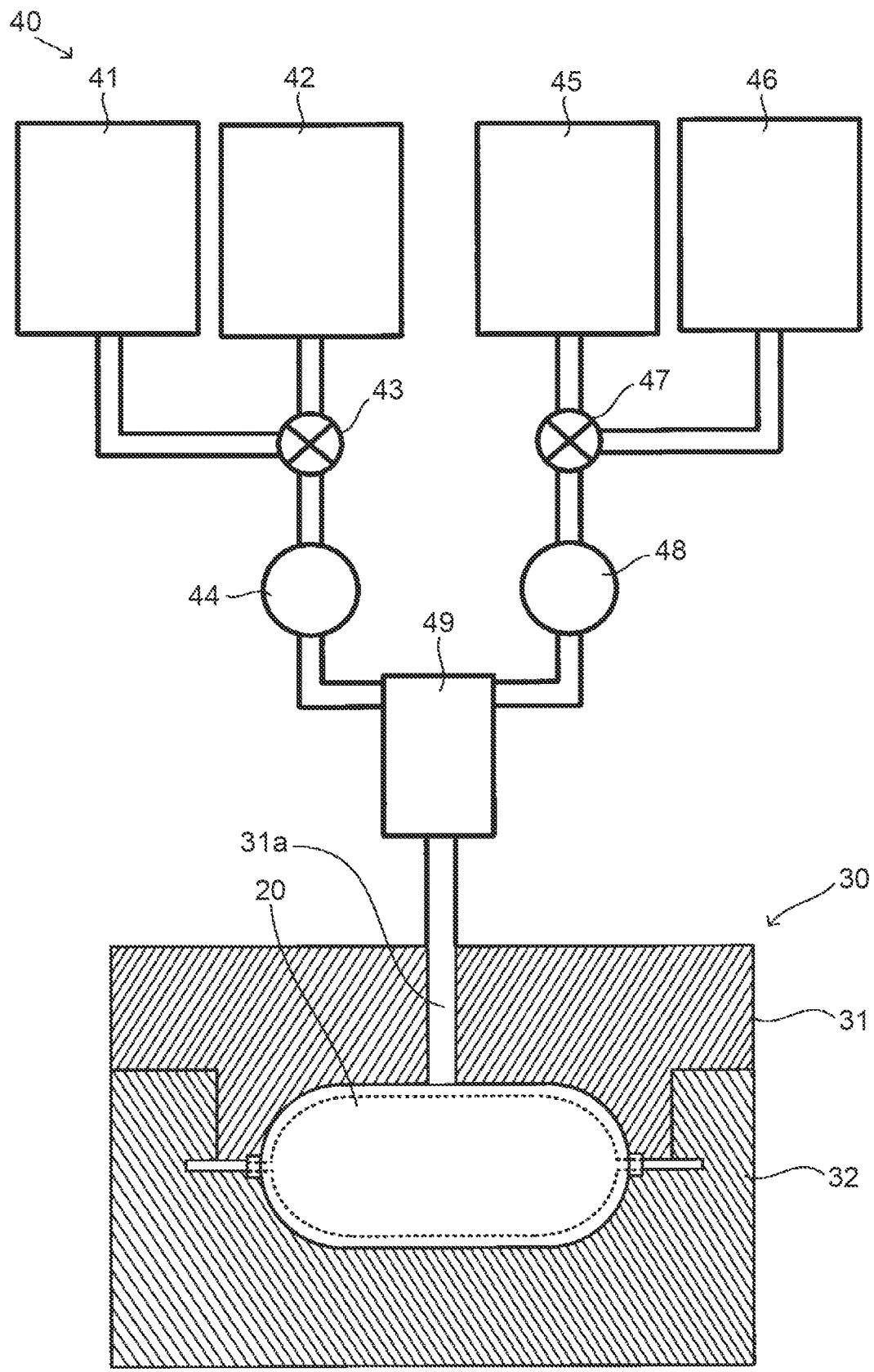
FIG. 4 is a view to describe configurations of an impregnating apparatus 40, the mold 30, and the preform 20 and a relationship between them.

Further, an apparatus (impregnating apparatus 40) for impregnation is schematically illustrated in FIG. 4.

As can be understood from the following description, this disclosure relates to a high-pressure tank manufactured by so-called resin transfer molding (RTM) performed such that a fiber layer included in a preform is impregnated with a resin composition and then hardened to form a reinforced layer.

Mold

The mold 30 is a mold in which the fiber layer 22 of the preform 20 is to be impregnated with resin. The mold 30 includes an upper mold 31 and a lower mold 32 in the present embodiment. When the upper mold 31 and the lower mold 32 are put on top of each other, an internal space along the shape of the preform 20 is formed inside the mold 30. Vacuum drawing is performable on the internal space, so that a sealed space can be formed.

Further, the upper mold 31 is movable relative to the lower mold 32 as indicated by a straight arrow in FIG. 3B. Hereby, the preform 20 can be set in the mold 30 and can be removed (released) from the mold 30. In addition to this, the upper mold 31 is movable to apply pressure to the preform 20 and is also movable to release the pressure thus applied. More specifically, the mold 30 can be brought into an open state, a clamping state, and an unloading state as described below.

The open state is an opened state (not shown) where the upper mold 31 is completely separated from the lower mold 32, and a top surface of the lower mold 32 is exposed. In this state, the preform 20 is set to the lower mold 32, and the preform 20 after impregnation is removed (released) from the mold 30.

Figure 6:
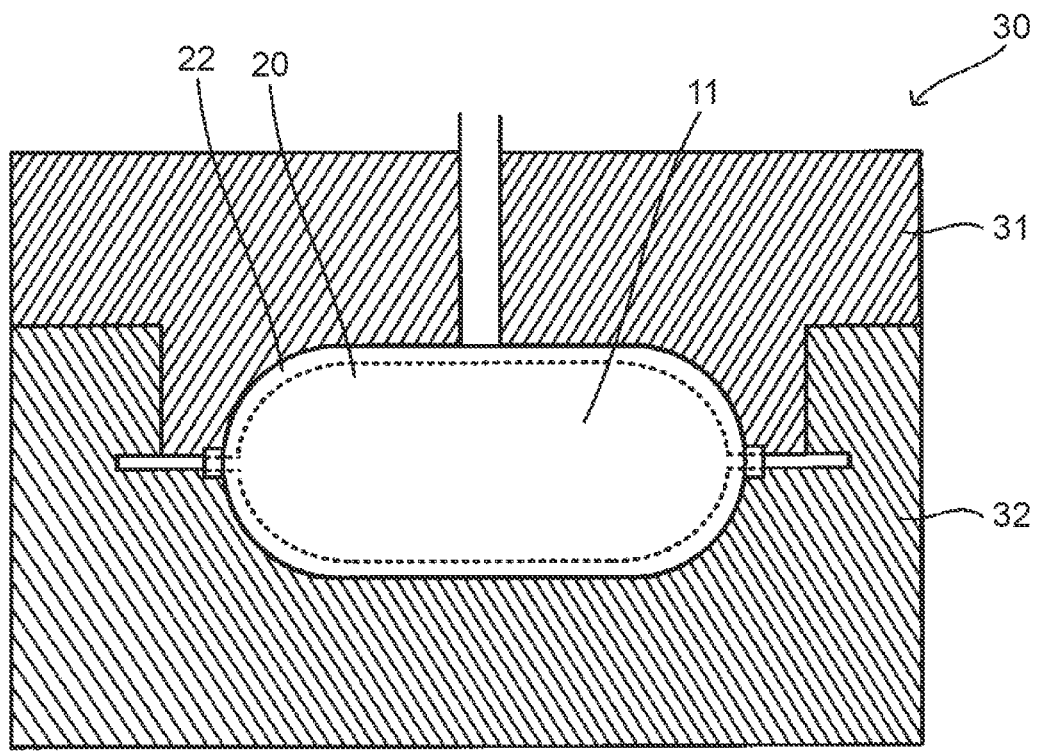
FIG. 6 is a view to describe step S11 of setup in a mold and degassing.

The clamping state is a state where, in a state where the preform 20 is set in the mold 30, the upper mold 31 and the lower mold 32 are completely connected to each other and clamped (see FIG. 3B, FIG. 6). Note that, even in the clamping state, it is preferable that a slight gap be formed between the fiber layer 22 of the preform 20 before impregnation and respective surfaces of the upper mold 31 and the lower mold 32. This gap is formed in consideration that, due to impregnation with the resin composition, the volume of the fiber layer 22 after impregnation becomes larger than the volume before impregnation, and the protective layer 13 is formed. The same gap is formed between the upper mold 31 and the preform 20 and between the lower mold 32 and the preform 20.

Figure 8:
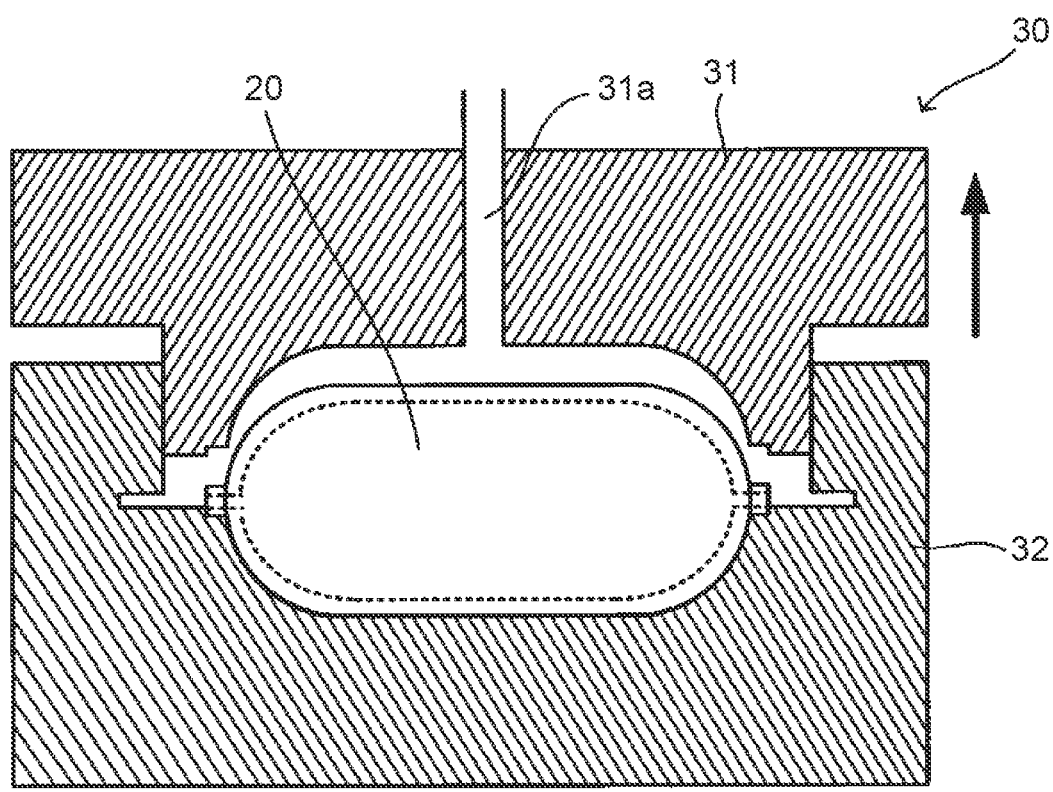
FIG. 8 is a view to describe step S13 of change to an unloading state.

The unloading state is a state where, in the state where the preform 20 is set in the mold 30, the upper mold 31 is slightly separated from the lower mold 32 as compared with the clamping state (see FIG. 8). The unloading state is established by slightly raising the upper mold 31 from the clamping state, for example. At this time, the gap formed between the upper mold 31 and the preform 20 becomes larger than the gap between the lower mold 32 and the preform 20.

Even in the unloading state, the sealing state is maintained so that the resin composition for impregnation, supplied to the inside of the mold 30, does not leak out from the mold 30.

Further, the upper mold 31 is provided with a passage 31$a$ reaching the fiber layer 22 of the preform 20 thus set, from outside the upper mold 31. When the resin composition is introduced into the passage 31$a$, the resin composition is supplied to the fiber layer 22 so that the fiber layer 22 is impregnated with the resin composition.

Further, the mold 30 is also provided with an airflow passage via which vacuum drawing (vacuum degassing) from the internal space formed in the mold 30 is performed.

Further, the mold 30 is configured such that its temperature can be maintained at a predetermined temperature by a temperature control device (not shown).

A material used for the mold 30 is not limited in particular. However, metal is preferably used as usual, and the mold 30 is a so-called metal mold.

Impregnating Apparatus

The impregnating apparatus 40 is an apparatus configured to supply the resin composition for impregnation to the mold 30 in which the preform 20 is set. As can be seen from FIG. 4, the impregnating apparatus 40 in the present embodiment includes a first base compound tank 41, a second base compound tank 42, a selector valve 43, a base compound pump 44, a first hardening agent tank 45, a second hardening agent tank 46, a selector valve 47, a hardening agent pump 48, and a mixer 49.

The first base compound tank 41 is a tank in which a base compound of the composition for impregnation is stored. The base compound will be described later.

The second base compound tank 42 is a tank in which a base compound containing the particles 13$b$ is stored. The base compound is the same as the base compound stored in the first base compound tank.

The selector valve 43 is connected to the first base compound tank 41, the second base compound tank 42, and the base compound pump 44. The selector valve 43 is configured to switch between a state where the base compound of the first base compound tank 41 is sent by the base compound pump 44 and a state where the base compound of the second base compound tank 42 is sent by the base compound pump 44. Accordingly, a pipe from the first base compound tank 41, a pipe from the second base compound tank 42, and a pipe to the base compound pump 44 are connected to the selector valve 43.

The base compound pump 44 is a pump configured to supply the base compounds stored in the first base compound tank 41 and the second base compound tank 42 to the mixer 49. Accordingly, the base compound pump 44 is connected to the mixer 49 via a pipe.

The first hardening agent tank 45 is a tank in which a hardening agent for the composition for impregnation is stored. The hardening agent will be described later.

The second hardening agent tank 46 is a tank in which a hardening agent containing the particles 13$c$ is stored. The hardening agent is the same as the hardening agent stored in the first hardening agent tank.

The selector valve 47 is connected to the first hardening agent tank 45, the second hardening agent tank 46, and the hardening agent pump 48. The selector valve 47 is configured to switch between a state where the hardening agent of the first hardening agent tank 45 is sent by the hardening agent pump 48 and a state where the hardening agent of the second hardening agent tank 46 is sent by the hardening agent pump 48. Accordingly, a pipe from the first hardening agent tank 45, a pipe from the second hardening agent tank 46, and a pipe to the hardening agent pump 48 are connected to the selector valve 47.

The hardening agent pump 48 is a pump configured to supply the hardening agents stored in the first hardening agent tank 45 and the second hardening agent tank 46 to the mixer 49. Accordingly, the hardening agent pump 48 is connected to the mixer 49 via a pipe.

The mixer 49 is a device configured to mix the base compound supplied thereto with the hardening agent supplied thereto and to send a resin composition formed by the mixing to the mold 30. More specifically, the mixer 49 is connected to the passage 31$a$ of the mold 30 via a pipe, and the resin composition thus sent enters the passage 31$a$ of the mold 30 through the pipe. As described above, the passage 31$a$ communicates with the fiber layer 22 of the preform 20 set in the mold 30, and therefore, when the resin composition is introduced into the passage 31$a$, the resin composition can be supplied to the fiber layer 22 such that the fiber layer 22 is impregnated with the resin composition.

1.4. Manufacturing Method of High-Pressure Tank

Next will be described a manufacturing method of a high-pressure tank. Here, for easiness to understand, the description is made with the preform 20, the mold 30, and the impregnating apparatus 40. However, the present disclosure is not limited to the use of the preform 20, the mold 30, and the impregnating apparatus 40.

Figure 5:
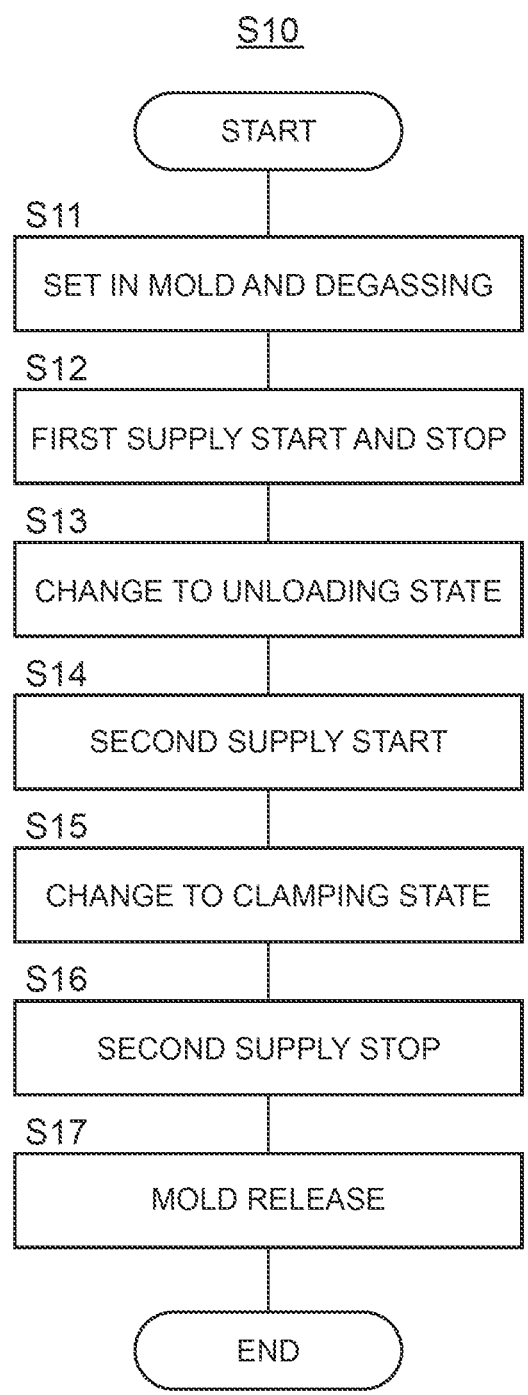
FIG. 5 is a view to describe the flow of a manufacturing method S10 of a high-pressure tank.

FIG. 5 illustrates the flow of a manufacturing method S10 of a high-pressure tank as one example. As can be seen from FIG. 5, the manufacturing method S10 in the present embodiment includes step S11 of setup in a mold and degassing, step S12 of first supply start and stop, step S13 of change to an unloading state, step S14 of second supply start, step S15 of change to a clamping state, step S16 of second supply stop, and step S17 of mold release. The following describes each step.

Step S11 of Setup in Mold and Degassing

In step S11 of setup in a mold and degassing (also just referred to as "step S11"), the preform 20 is set in the mold 30, and the mold 30 is degassed by vacuum drawing as illustrated in FIG. 6. The degassing allows the resin composition for impregnation to be easily infiltrated into the fiber layer 22, so that impregnation is performed more smoothly.

More specifically, in the present embodiment, the mold 30 is brought into the open state, so that the preform 20 is set on the lower mold 32 the top surface of which is greatly exposed. After that, the upper mold 31 is placed to cover to the lower mold 32 and the preform 20 set on the lower mold 32, so that the clamping state is established. Then, vacuum degassing is performed by a vacuum pump.

The vacuum degassing is finished before a first resin composition is supplied to the fiber layer 22 in the subsequent step.

Step S12 of First Supply Start and Stop

In step S12 of first supply start and stop (also just referred to as "step S12"), the first resin composition in which the base compound not containing the particles 13*b* is mixed with the hardening agent not containing the particles 13*c* is supplied to the fiber layer 22, and after that, the supply is stopped.

Base Compound

The base compound is a material that can reinforce the fiber layer such that the material is infiltrated into the fiber layer 22 and hardened, and an appropriate material can be used within that purpose. In the present embodiment, epoxy resin is used, but in addition to this, polyurethane resin, phenolic resin, melamine resin, and the like are also usable.

Hardening Agent and First Resin Composition

The hardening agent is a material that hardens the base compound when the hardening agent is mixed with the base compound. When the hardening agent is mixed with the base compound, the first resin composition is formed. Accordingly, in the present embodiment, the hardening agent is constituted by a material that can harden epoxy resin.

The type of the hardening agent is not limited in particular, provided that the first resin composition that satisfies the above description can be formed. However, examples of the hardening agent can be aromatic polyamine such as dicyandiamide and methaphenilene diamine. In addition to this, aliphatic polyamine such as xylene diamine and diethylene triamine can be used.

The supply amount of the first resin composition is not limited in particular, but it is preferable that the supply amount be not less than 50% by mass but not more than 90% by mass to the total amount of the first resin composition and a second resin composition (described below).

Supply Stop of First Resin Composition

The supply stop of the first resin composition is performed when the supply amount of the first resin composition is satisfied.

Specific Mode of Present Embodiment

Figure 7:
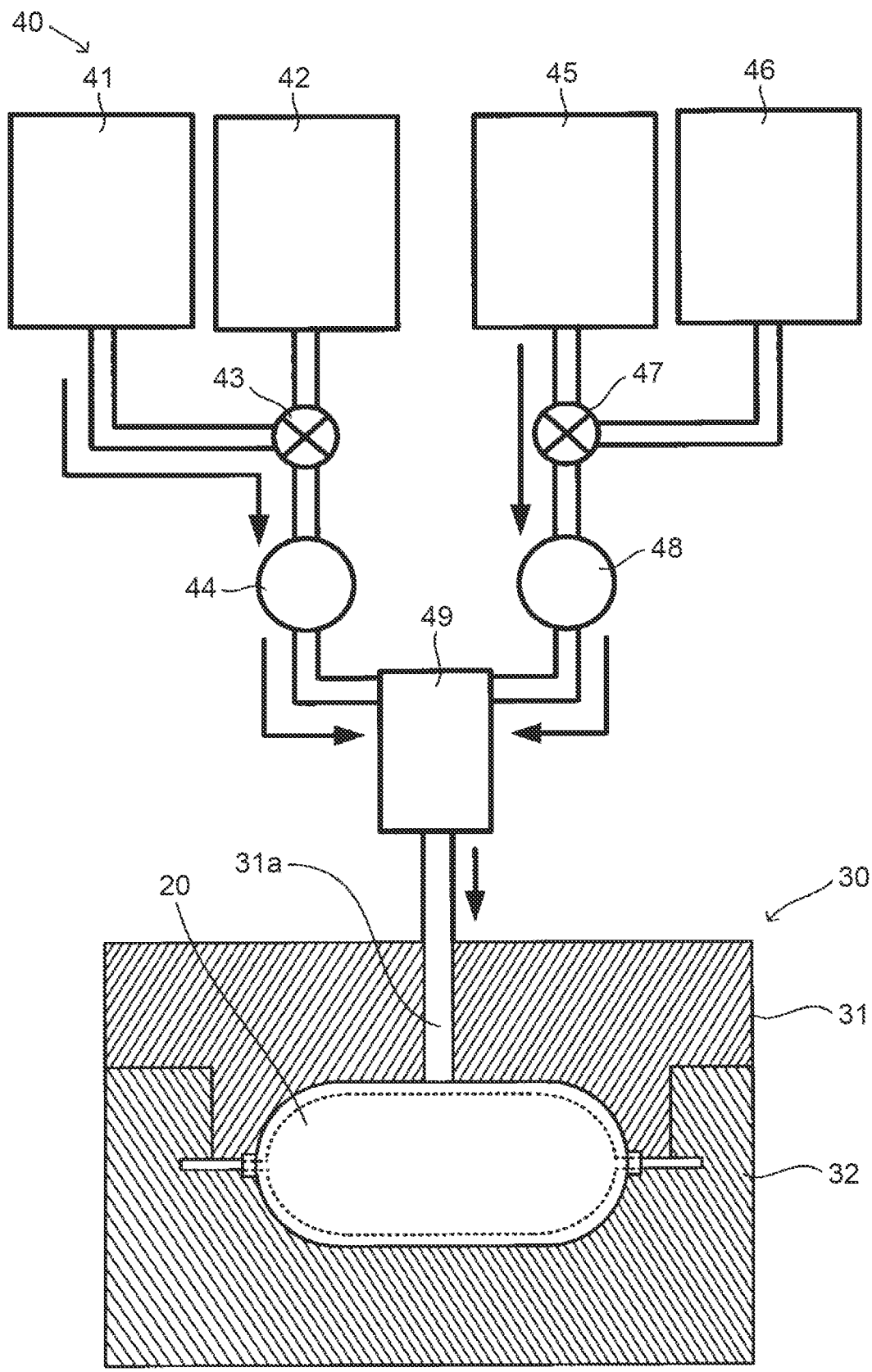
FIG. 7 is a view to describe step S12 of first supply start and stop.

More specifically, in the present embodiment, as illustrated in FIG. 7, the selector valve 43 opens the passages from the first base compound tank 41 and the base compound pump 44 and closes the passage from the second base compound tank 42.

Hereby, the base compound stored in the first base compound tank 41 is supplied to the mixer 49 by the base compound pump 44. Meanwhile, the selector valve 47 opens the passages from the first hardening agent tank 45 and the hardening agent pump 48 and closes the passage from the second hardening agent tank 46. Hereby, the hardening agent stored in the first hardening agent tank 45 is supplied to the mixer 49 by the hardening agent pump 48.

In the mixer 49, the base compound thus supplied is mixed with the hardening agent thus supplied, so that the first resin composition is formed. The mixer 49 supplies the first resin composition thus formed to the passage 31*a* of the mold 30. The first resin composition thus supplied reaches the outer periphery of the fiber layer 22 of the preform 20 set in the mold 30 and then infiltrates into the fiber layer 22, so that the fiber layer 22 is impregnated with the first resin composition.

Step S13 of Change to Unloading State

In step S13 of change to the unloading state (also just referred to as "step S13"), after the first supply is stopped in step S12, the upper mold 31 is moved to be slightly separated from the lower mold 32, so that the mold 30 is changed to the unloading state. Hereby, force to press the preform 20 is relaxed, and a slight gap is formed between the upper mold 31 and the preform 20. The size of the gap is not limited in particular but can be about 10% of the thickness of the fiber layer.

In the present embodiment, as illustrated in a straight arrow in FIG. 8, the change to the unloading state is performed by moving the upper mold 31 upward.

Step S14 of Second Supply Start

In step S14 of second supply start (also just referred to as "step S14"), the second resin composition in which the base compound containing the particles 13*b* is mixed with the hardening agent containing the particles 13*c* is supplied to the mold 30 in the unloading state. The supply amount of the second resin composition, that is, how much the second resin composition should be supplied is determined based on the supply amount of the first resin composition and the thickness of the protective layer to be formed.

Base Compound Containing Particles 13*b*

The base compound containing the particles 13*b* is a material that can reinforce the fiber layer such that a part of the material is infiltrated into the fiber layer 22 and hardened, and another part of the material is turned into the binder layer 13*a* of the protective layer 13. An appropriate material can be used within that purpose. In the present embodiment, epoxy resin that is the same as the base compound of the first resin composition is used. When the same base compound is used for the first resin composition and the second resin composition, a difference in physical property can be made small. This can more hardly cause malfunction for performance such as strength or detachment between layers. However, if such a problem in performance is not caused, different base compounds can be used.

In the meantime, the particles 13*b* are the particles mentioned above, and the amount of the particles 13*b* to be contained can be determined based on the protective layer 13 to be formed and is not limited in particular.

Hardening Agent Containing Particles 13*c*

The hardening agent containing the particles 13*c* is a material that hardens the base compound when the hardening agent is mixed with the base compound. Accordingly, in the present embodiment, the hardening agent is constituted by a material that can harden epoxy resin. In the present embodiment, the same hardening agent as the hardening agent of the first resin composition is used. This makes it possible to reduce the number of types of necessary materials and to restrain cost.

However, a hardening agent different from the hardening agent used in the first resin composition is also usable. For example, a hardening agent that starts hardening at a temperature lower than the temperature at which the first resin composition starts hardening may be used for the second resin composition. This can make it possible to harden the outer layer side much earlier.

In the meantime, the particles 13$c$ are the particles mentioned above, and the amount of the particles 13$c$ to be contained can be determined based on the protective layer 13 to be formed and is not limited in particular.

Specific Mode in Present Embodiment

Figure 9:
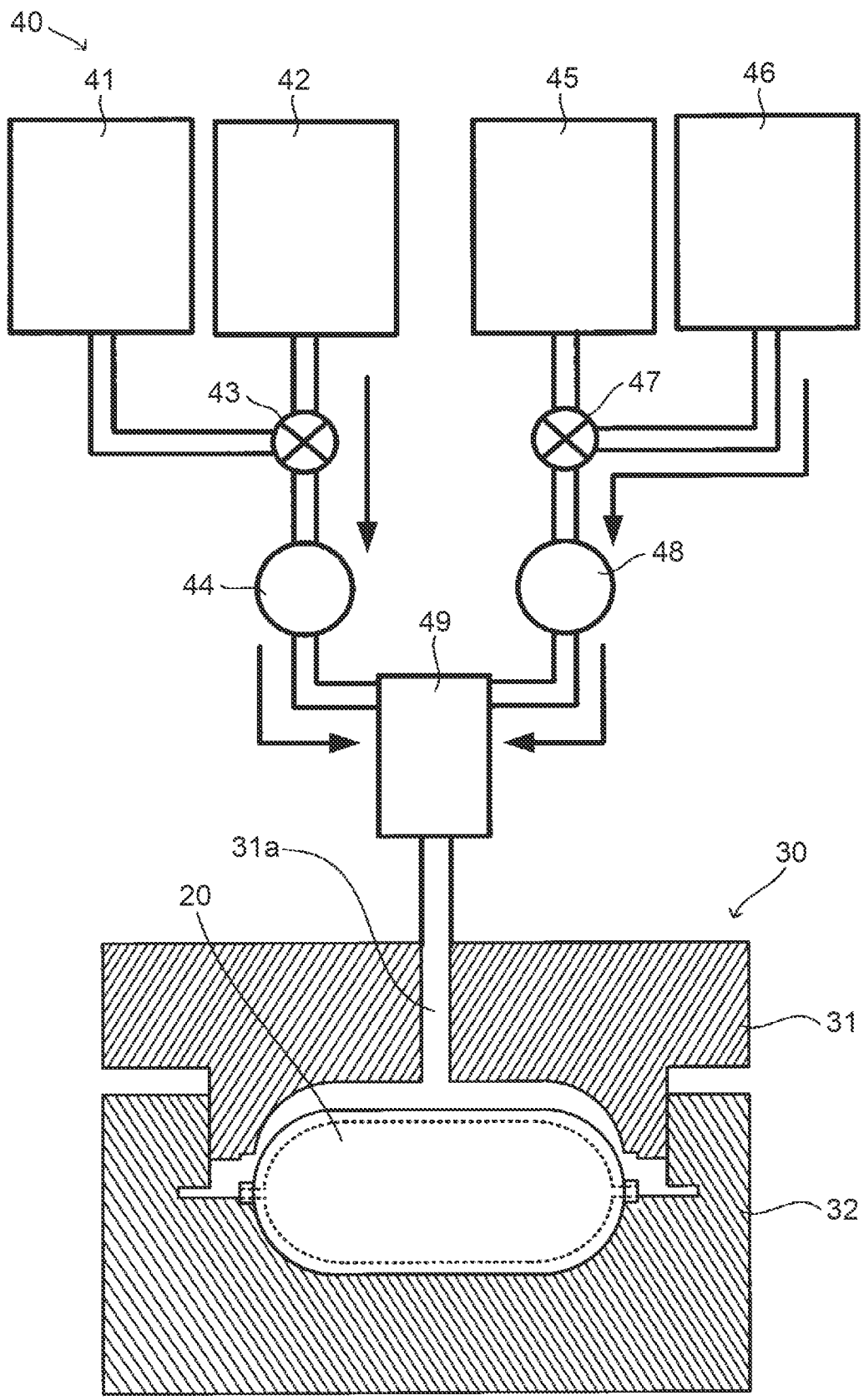
FIG. 9 is a view to describe step S14 of second supply start.

More specifically, in the present embodiment, as illustrated in FIG. 9, the selector valve 43 opens the passages from the second base compound tank 42 and the base compound pump 44 and closes the passage from the first base compound tank 41. Hereby, the base compound containing the particles 13$b$ and stored in the second base compound tank 42 is supplied to the mixer 49 by the base compound pump 44. Meanwhile, the selector valve 47 opens the passages from the second hardening agent tank 46 and the hardening agent pump 48 and closes the passage from the first hardening agent tank 45. Hereby, the hardening agent containing the particles 13$c$ and stored in the second hardening agent tank 46 is supplied to the mixer 49 by the hardening agent pump 48.

In the mixer 49, the particles 13$b$, the particles 13$c$, the base compound, and the hardening agent thus supplied are mixed together, so that the second resin composition is formed. The mixer 49 supplies the second resin composition thus formed to the passage 31$a$ of the mold 30. The second resin composition thus supplied reaches the outer periphery of the fiber layer 22 of the preform 20 set in the mold 30. At this time, the mold 30 has been brought into the unloading state in step S13, so that the pressure to the preform 20 from the mold 30 is restrained, and the gap is formed between the upper mold 31 and the preform 20. This consequently makes it possible to restrain a resistance at the time when the second resin composition flows. On this account, the second resin composition thus supplied is smoothly filled into a whole space between the upper mold 31 and the preform 20.

Step S15 of Change to Clamping State

In step S15 of change to the clamping state (also just referred to as "step S15"), the upper mold 31 is moved to approach the lower mold 32, so that the clamping state is established. Hereby, the pressure that the second resin composition receives from the mold 30 increases, so that impregnation with the second resin composition is promoted, and the second resin composition placed near the outer surface of the fiber layer 22 is levelled. Thus, the fiber layer 22 has a smooth surface.

Further, the particles 13$b$ and the particles 13$c$ are deposited on the surface of the fiber layer 22 without entering the fiber layer 22, and similarly, the mixture of the base compound and the hardening agent, the mixture being remaining on the surface of the fiber layer 22, is also deposited. When the mixture is hardened, the mixture is turned into the binder layer 13$a$ to hold the particles 13$b$ and the particles 13$c$, so that the protective layer 13 is formed.

Here, when the particles 13$b$ have rough surfaces and the particles 13$c$ have conductivity like the present embodiment, the adhesion properties to the binder layer 13$a$ and the fiber layer 22 increases, so that a more stable protective layer is formed.

Figure 10:
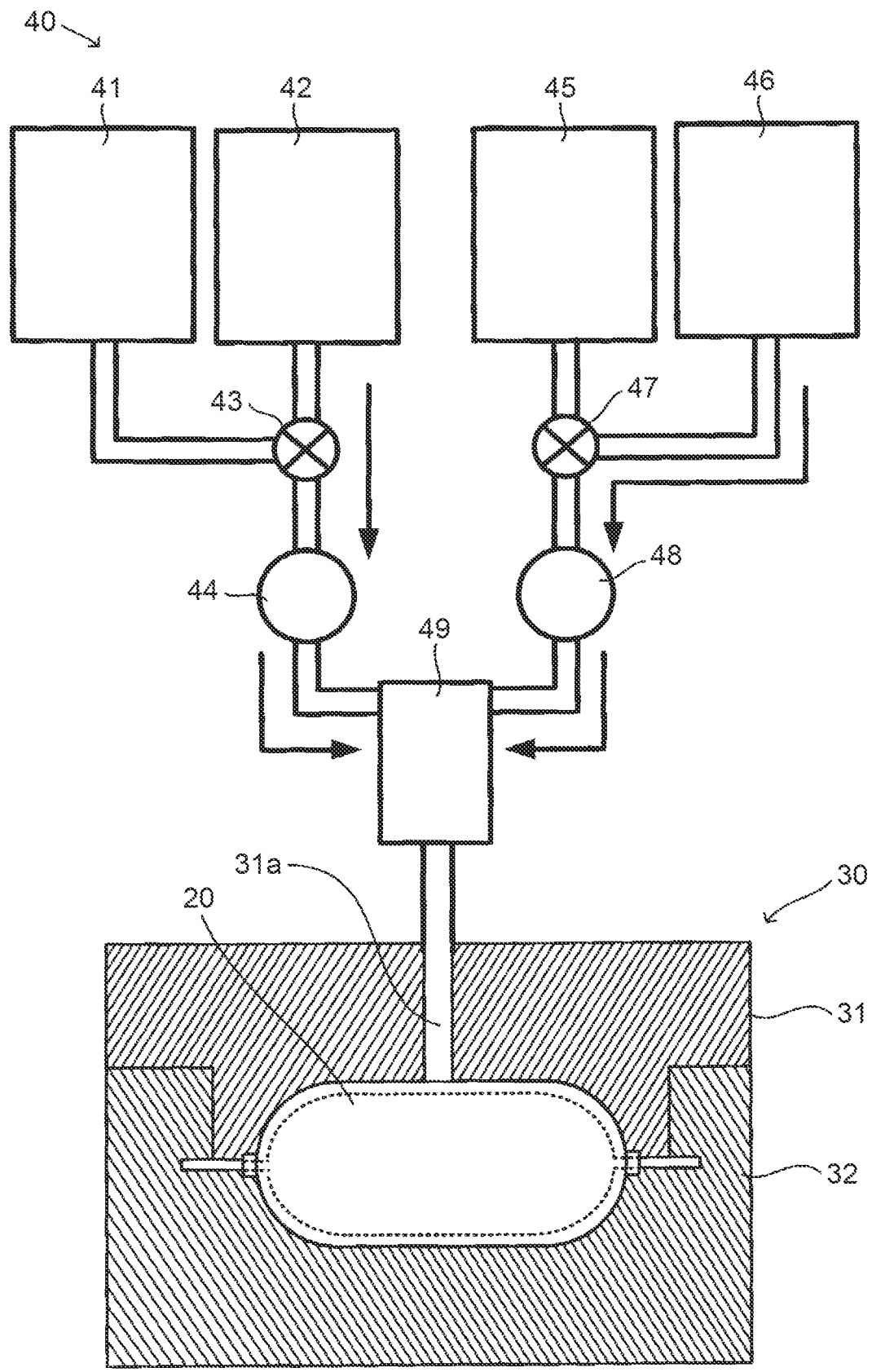
FIG. 10 is a view to describe step S15 of change to clamping state.

In the present embodiment, as illustrated in FIG. 10, this step is performed such that the upper mold 31 is brought close to the lower mold 32.

Step S16 of Second Supply Stop

In step S16 of second supply stop (also just referred to as "step S16"), the supply of the second resin composition is stopped when the change to the clamping state is performed in step S15 so that the fiber layer is sufficiently impregnated with the second resin composition, the particles 13$b$ and the particles 13$c$ are deposited on the outer periphery of the fiber layer, and the binder layer 13$a$ can be secured. The mold 30 is kept still until the second resin composition is hardened.

Step S17 of Mold Release

In step S17 of mold release (also just referred to as "step S17"), the preform 20 impregnated with resin is removed from the mold 30 when, in step S16, at least the second resin composition is hardened, and the resin composition on the outer layer side of the fiber layer 22 and the binder layer 13$a$ of the protective layer 13 are hardened.

In the present embodiment, mold release is performed such that the upper mold 31 of the mold 30 is removed from the lower mold 32 to bring the mold 30 into the open state.

Supplementary Matter

The present embodiment deals with an example in which the particles 13$b$ are contained in the base compound, and the particles 13$c$ are contained in the hardening agent. However, the particles 13$b$ may be contained in the hardening agent, and the particles 13$c$ may be contained in the base compound, provided that no trouble is caused due to reaction. Alternatively, the particles 13$b$ and the particles 13$c$ may be both contained in the base compound and the hardening agent, or the particles 13$b$ and the particles 13$c$ may be both contained in the base compound or the hardening agent.

As described above, the particles may not have rough surfaces or may not be coated with a conductive material, and only either of the particles 13$b$ and the particles 13$c$ may be used. However, even in either of the cases, when the particles are provided in any of the tanks, it is possible to form the protective layer similarly to the above.

1.5. Effects and Others

With the use of the manufacturing method including the above-mentioned steps, and the mold and the impregnating apparatus for the manufacturing method, the preform 20 impregnated with resin is obtained, and the high-pressure tank 10 is formed through other steps as needed in addition to the steps.

In this disclosure, since the high-pressure tank includes the protective layer containing the particles, it is not necessary to use a protective layer made of glass fiber. This makes it possible to improve the strength and reduce manufacturing cost. Further, the reinforced layer and the protective layer can be formed integrally. This hardly causes a problem of detachment between layers, thereby making it possible to improve the strength between layers.

When resin particles are used as the particles, it is possible to give high strength and high impact absorbency to the protective layer. The resin particles can be hardly broken even under a high pressure at the time of impregnation, and the resin particles hardly enter the fiber layer. This can reduce such a concern that the resin particles affect high-pressure performance. Since the resin particles are lightweight, the resin particles contribute a weight reduction of the high-pressure tank. When the resin particles are hollow, it is also possible to further reduce the weight of the high-pressure tank and to increase impact absorption performance. When the surfaces of the particles are roughened or when the conductivity is given to the particles, it is possible to further improve the adhesion properties of the particles with the binder layer and the reinforced layer. Further, when the conductivity is given to the particles, it is possible to improve a label adhesive property.

2. Embodiment 2

In Embodiment 2, particles 113b and particles 113c made of glass are used instead of the particles 13b and the particles 13c made of resin in Embodiment 1. Although the particles 113b and the particles 113c are not illustrated, they are mentioned as the particles 113b and the particles 113c so as to be distinguished from the particles 13b and the particles 13c.

The description of Embodiment 1 applies to Embodiment 2 except that the particles 113b and the particles 113c are used, and therefore, the following describes the particles 113b and the particles 113c.

Similarly to the particles 13b and the particles 13c, the particles 113b and the particles 113c constitute the protective layer 13 such that innumerable particles 113b and particles 113c are placed to cover the reinforced layer 12. In the present embodiment, the particles 113b and the particles 113c are hollow particles made of glass, and such particles are also called glass microballoon (GMB). The GMB is made of borosilicate sodium glass, borosilicate glass, ceramics, alumino silicate glass, and the like.

In the present embodiment, the particles 113b and the particles 113c are particles made of glass as described above. The particles (GMB) made of glass are lightweight and have high strength. When the size of the particles is made larger than gaps in the fiber layer, the particles do not enter the fiber layer. As a result, it is possible to form a lightweight protective layer with high strength without affecting the performance of the reinforced layer of the high-pressure tank.

Further, from the viewpoint of weight reduction, it is preferable that the particles 113b and the particles 113c be hollow like the GMB, but the particles 113b and the particles 113c may be solid.

The shapes of the particles 113b and the particles 113c are not limited in particular, but it is preferable that the particles 113b and the particles 113c have a spherical shape or a shape close to the spherical shape. This can restrain particle surfaces from damaging the reinforced layer.

The particle diameters of the particles 113b and the particles 113c are not limited in particular, but the particles 113b and the particles 113c have at least a size that does not allow them to greatly enter the fiber layer of the reinforced layer 12. Generally, fibers are placed to be wound in the fiber layer without any gap, and therefore, the particles 113b and the particles 113c do not greatly enter the fiber layer. However, the average particle diameters of the particles 113b and the particles 113c can be not less than 20 μm but not more than 100 μm, for example.

In the present embodiment, a surface active agent is attached to the surfaces of the particles 113b, and the surface active agent is a surface active agent in which hydrophilic groups are arranged to face outward (a side opposite to the GMB). Hereby, it is possible to increase adhesion properties of the particles 113b with resin (epoxy resin) of the binder layer 13a and the reinforced layer 12, thereby making it possible to form a protective layer having stably high strength and hardly causing falling of the particles and detachment between layers.

In the meantime, in the present embodiment, a surface active agent is attached to the surfaces of the particles 113c, and the surface active agent is a surface active agent in which hydrophobic groups are arranged to face outward (the side opposite to the GMB). Hereby, slipping properties with respect to resin (epoxy resin) of the binder layer 13a and the reinforced layer 12 are improved, so that the fluidity of the resin composition can be increased and the impregnation property can be improved.

The present embodiment deals with an example in which two types of particles, i.e., the particles 113b and the particles 113c, are contained as the particles. However, it is not necessary to use the two types of particles, and particles of either one of the types may be used.

Further, in the present embodiment, the particles 113b and particles 113c coated with the surface active agents are used. However, the present disclosure is not limited to this, and normal particles with surfaces to which such functions are not given (the surface active agents are not attached) can be employed. Even in this case, the function as the protective layer is achievable.

Further, when a manufacturing method of a high-pressure tank using the particles 113b and the particles 113c includes steps like those in the example of the manufacturing method S10 described above, the high-pressure tank can be manufactured. Note that the particles 113c coated with the surface active agent in which hydrophobic groups are arranged to face outward (the side opposite to the GMB) may react with the hardening agent and decrease the performance of epoxy resin as the base compound. In view of this, it is preferable that the particles 113c be provided in the second base compound tank.

A preform impregnated with resin can be obtained even by use of the manufacturing method including the steps and using the particles 113b and the particles 113c, and the mold and the impregnating apparatus for the manufacturing method. The high-pressure tank is formed through other steps as needed in addition to the steps.

Even in this embodiment, since the high-pressure tank includes the protective layer containing the particles, it is not necessary to use a protective layer made of glass fiber. This makes it possible to improve the strength and reduce manufacturing cost. Further, the reinforced layer and the protective layer can be formed integrally. This hardly causes a problem such as detachment between layers, thereby making it possible to improve the strength between layers.

When glass particles are used as the particles, it is possible to give high strength to the protective layer. The glass particles can be hardly broken even under a high pressure at the time of impregnation, and the glass particles hardly enter the fiber layer. Accordingly, it is possible to reduce such a concern that the glass particles affect the performance of the high-pressure tank. Since the glass particles are also lightweight, the glass particles contribute a weight reduction of the high-pressure tank. When the glass particles are hollow, it is also possible to further reduce the weight of the high-pressure tank.

Further, when respective surface active agents are attached to the surfaces of respective particles, and the orientations of the hydrophilic groups and the hydrophobic groups of the respective surface active agents are adjusted, the adhesion properties with the binder layer and the reinforced layer can be further improved, so that the fluidity of the resin composition can be increased and the impregnation property can be improved.

What is claimed is:

1. A manufacturing method for manufacturing a tank, the manufacturing method comprising:
   forming a fiber layer on an outer surface of a liner to obtain a preform;
   providing a mold;
   placing the preform in the mold; and
   infiltrating resin into the fiber layer of the preform, wherein
   the infiltrating includes
   a first supply step of supplying a first resin to the fiber layer of the preform; and
   a second supply step of, after the first supply step, supplying, to the fiber layer, a second resin to which spherical particles are added, and wherein
   the spherical particles include at least one of resin hollow particles having surfaces to which a minute material is attached or resin hollow particles having surfaces to which a conductive material is attached.

2. The manufacturing method according to claim 1, wherein the second resin supplied in the second supply step is resin configured to harden when a base compound is mixed with a hardening agent.

* * * * *